(12) United States Patent
 Tanaka

(10) Patent No.: US 11,368,601 B2
(45) Date of Patent: Jun. 21, 2022

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Tatsuyuki Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 418 days.

(21) Appl. No.: 16/211,193

(22) Filed: Dec. 5, 2018

(65) Prior Publication Data
US 2019/0281188 A1    Sep. 12, 2019

(30) Foreign Application Priority Data

Mar. 12, 2018  (JP) .............................. JP2018-044569

(51) Int. Cl.
*G06F 15/00* (2006.01)
*H04N 1/44* (2006.01)
*H04N 1/32* (2006.01)

(52) U.S. Cl.
CPC ......... *H04N 1/444* (2013.01); *H04N 1/32416* (2013.01); *H04N 2201/0094* (2013.01)

(58) Field of Classification Search
CPC ............... H04N 1/444; H04N 1/32416; H04N 2201/0094
USPC ........................................................ 358/1.14
See application file for complete search history.

(56) References Cited

U.S. PATENT DOCUMENTS 8,718,078 B2    5/2014  Ooba
2018/0285031 A1*  10/2018  Dalvi .................... G06F 3/1206

FOREIGN PATENT DOCUMENTS

| JP | 2000092111 | 3/2000 |
| JP | 2013138284 | 7/2013 |
| JP | 2014030115 | 2/2014 |
| JP | 5511332    | 6/2014 |

OTHER PUBLICATIONS

"Office Action of Japan Counterpart Application" with English translation thereof, dated Feb. 8, 2022, p. 1-p. 9.

* cited by examiner

*Primary Examiner* — Mark R Milia
(74) *Attorney, Agent, or Firm* — JCIPRNET

(57) ABSTRACT

An information processing apparatus includes; a plurality of network interfaces; a storage area for storing data; and a memory section that stores regulation information that defines a network interface permitted as an output path of data stored in the storage area in association with the storage area.

12 Claims, 8 Drawing Sheets

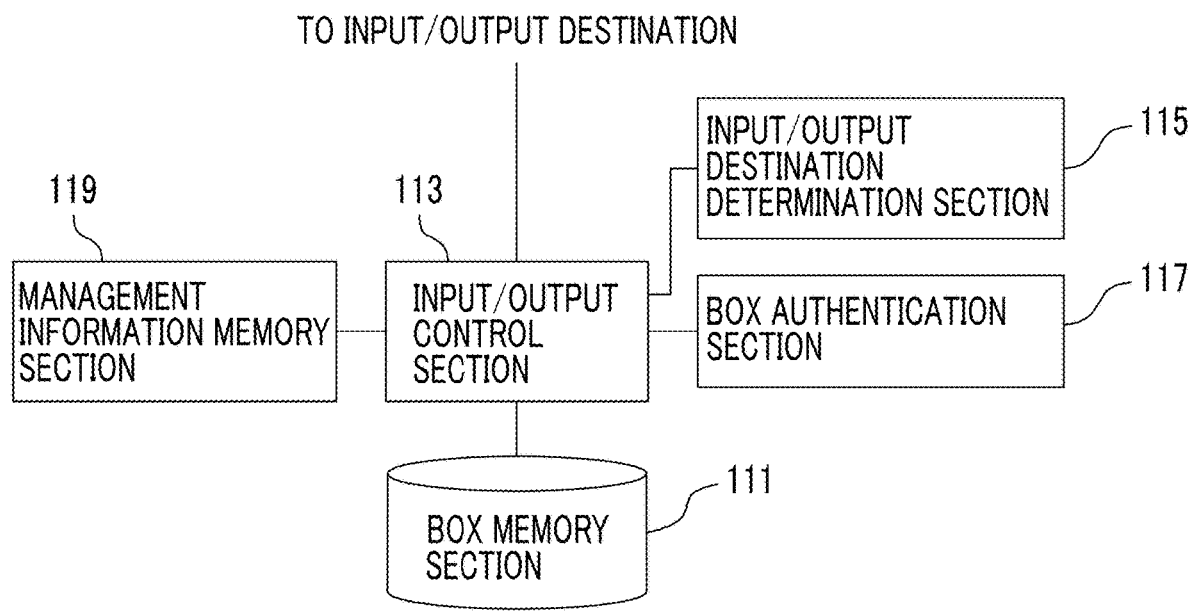

| PATTERN ID | INPUT PERMITTED PATH | OUTPUT PERMITTED PATH |
|---|---|---|
| PATTERN 1 | LAN1/Wi-Fi | LAN1 |
| PATTERN 2 | LAN2 | LAN2 |
| PATTERN 3 | LAN1/LAN2/Wi-Fi | NONE |

FIG. 10

| NETWORK GROUP ID | NETWORK INTERFACE INFORMATION | UNDESIGNATED INFORMATION |
|---|---|---|
| GROUP 6 | LAN1/Wi-Fi | LAN1 |
| GROUP 7 | LAN2 | LAN2 |

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-044569 filed Mar. 12, 2018.

BACKGROUND

(i) Technical Field

The present invention relates to an information processing apparatus, and a non-transitory computer readable medium storing a program.

(ii) Related Art

Among information processing apparatuses, there are apparatuses that are simultaneously connectable to plural different networks through plural network interfaces. This type of information processing apparatus may be connected to both a first network handling data with high confidentiality and a second network which is not so. For example, in a case where the information processing apparatus is an expensive apparatus such as a digital multifunction peripheral, it is advantageous in terms of cost that it can be shared in the first network and the second network. In such a case, after data handled on the first network is temporarily stored in the storage area in the information processing apparatus, the data may be leaked onto the second network from the storage area.

In a system disclosed in JP5511332B, in a case of receiving a job through any network, a print control device specifies the network through which the job is received, adds information on the specified network as an attribute value of the job. In storing information in an image forming apparatus, the network information added as the attribute value of the job is stored in a management table and managed with the job. Then, in a case where a request to acquire data stored in the HDD is issued from a terminal device, the network information is added to the data by referring to the management table, it is determined whether or not a transmission condition is satisfied, based on the network information and destination network information, and data is transmitted in a case where the condition is satisfied.

SUMMARY

Aspects of non-limiting embodiments of the present disclosure relate to an information processing apparatus, and a non-transitory computer readable medium storing a program that prevent data in a storage area from being leaked to a wrong network, in a case where data may be stored in a storage area in an information processing apparatus having plural network interfaces, not only through a network interface but also by a method not passing through the network interface.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an information processing apparatus including plural network interfaces; a storage area for storing data; and a memory that stores regulation information that defines a network interface permitted as an output path of data stored in the storage area in association with the storage area.

BRIEF DESCRIPTION OF THE DRAWINGS

Exemplary embodiment(s) of the present invention will be described in detail based on the following figures, wherein:

FIG. 3 is a diagram illustrating a mechanism for controlling documents stored in a box so as not to leak out to a network that is not permitted by security;

FIG. 4 is a diagram showing an example of a data structure of input/output path access authority information;

FIG. 10 is a diagram showing an example of a data structure of input/output path access authority information including items of undesignated information.

DETAILED DESCRIPTION

Figure 1:
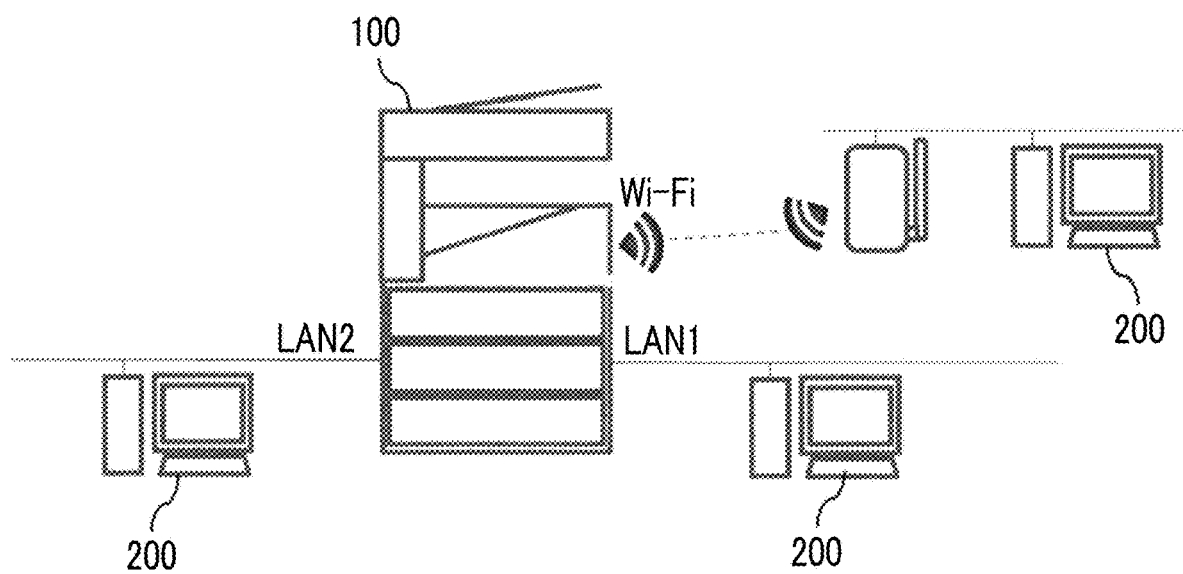
FIG. 1 shows an example of a network environment to which a multifunction peripheral 100 as an exemplary embodiment of an information processing apparatus according to the present invention is connected.

FIG. 1 shows an example of a network environment to which a multifunction peripheral 100 as an exemplary embodiment of an information processing apparatus according to the present invention is connected.

In this example, the multifunction peripheral 100 includes three built-in network interfaces, and is connected to three different networks of LAN1, LAN2, and Wi-Fi (registered trademark), through the network interfaces. A computer 200 such as a personal computer (PC) or a mobile terminal on each network exchanges data with the multifunction peripheral 100 through a network to which each computer 200 is connected. Note that the multifunction peripheral is a device having functions of a printer, a scanner, a copier, a facsimile, and the like.

Figure 2:
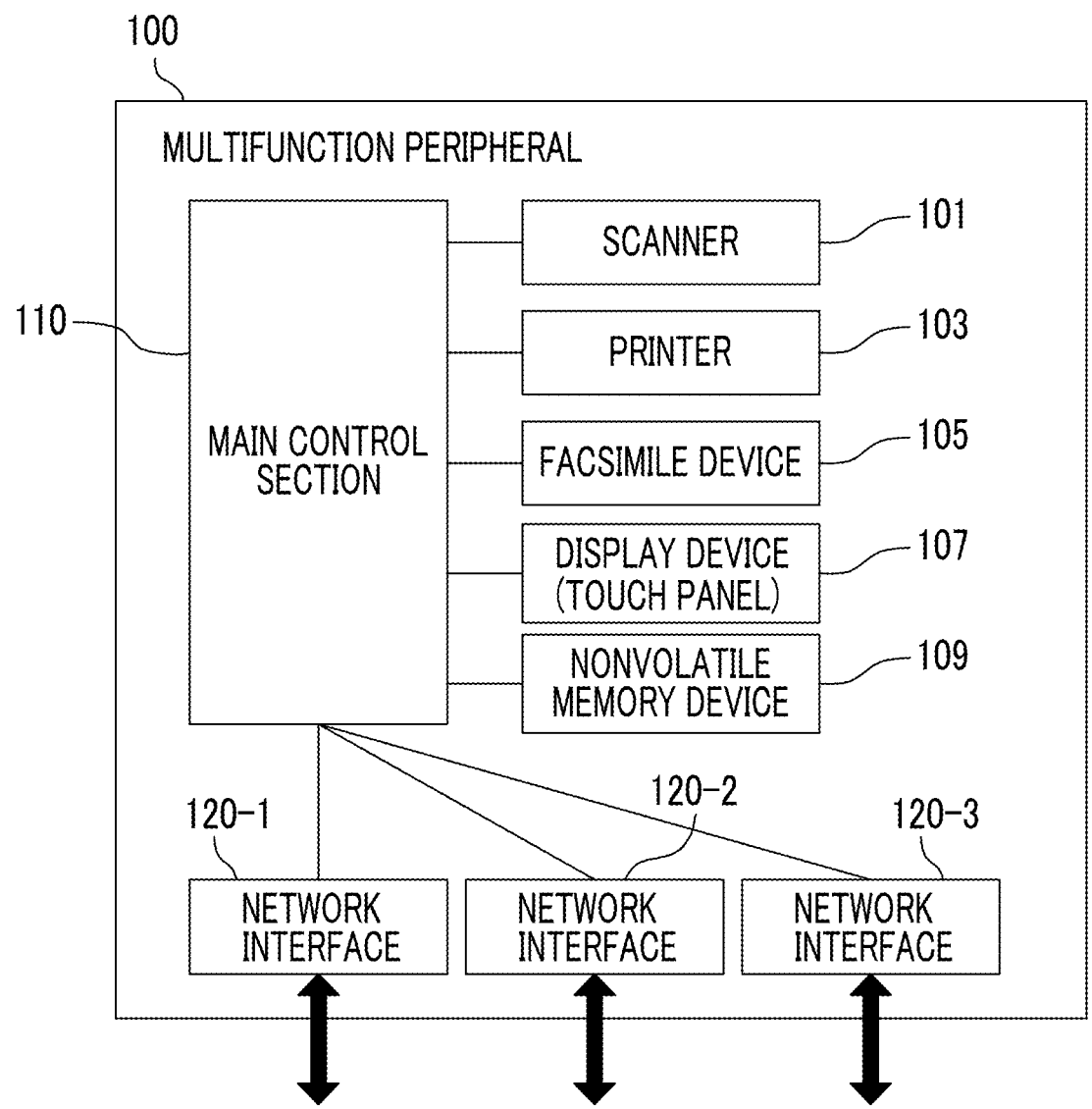
FIG. 2 is a diagram illustrating an internal configuration of the multifunction peripheral.

FIG. 2 shows an example of the internal configuration of the multifunction peripheral 100. The multifunction peripheral 100 includes a scanner 101, a printer 103, a facsimile device 105, a display device 107, a nonvolatile memory device 109, a main control section 110, network interfaces 120-1, 120-2 and 120-3 (they are collectively referred to as "network interface 120").

The scanner 101 optically reads an image of a document and generates image data representing the image. The printer 103 prints the image represented by the image data on paper. A copy process is realized by causing the scanner 101 and the printer 103 to cooperatively operate. The facsimile device 105 transmits and receives facsimile. The display device 107 is a device that displays a screen for user interface (UI) of the multifunction peripheral 100. In this example, the display device 107 is configured as a touch panel type device and also serves as an input device (although this is merely an example). The nonvolatile memory device 109 is a memory device that retains the storage even in a case where the power supply is turned off, and a hard disk drive or a flash memory is an example thereof.

The main control section 110 is a device that controls the operation of the multifunction peripheral 100, and includes a computer that processes data and a control program that the computer executes. The main control section 110 receives the user's input to the UI screen displayed on the display device 107, and controls the scanner 101, the printer 103, the facsimile device 105, and the like in accordance with the input, thereby realizing the process instructed by the user. Further, the main control section 110 is connected to the network through the network interfaces 120-1, 120-2 and 120-3, and exchanges instructions and data with the computers on the network. In the example of FIG. 1 and FIG. 2, it is assumed that the network interface 120-1 is connected to the LAN1, the network interface 120-2 is connected to the LAN2, and the network interface 120-3 is connected to the network through Wi-Fi. For the following explanation, in this example, at least LAN1 and LAN2 are assumed to be different networks. Further, it is assumed that the network to which the multifunction peripheral 100 is connected through Wi-Fi is connected to the LAN1.

The multifunction peripheral 100 has a function of storing image data, print data described in page description language, or electronic document data (hereinafter simply referred to as "document") such as files generated by various applications in the nonvolatile memory device 109.

Plural document storage areas can be provided in the multifunction peripheral 100. There is no particular limitation on the specific realization method of the storage area. For example, the individual storage areas may be one folder managed by the file system of the main control section 110, or one logical partition or logical drive set for the nonvolatile memory device 109. Further, plural nonvolatile memory devices 109 (physical drives) may be provided in the multifunction peripheral 100, and these individual physical drives may be defined as separate storage areas. In addition, storage areas of these illustrated types may be used in combination. In the following, individual storage areas are figuratively called "boxes". In order to limit users accessible to individual boxes, it is also possible to set passwords for the boxes or to define the access authority of each user to the box by an access control list.

The main control section 110 has a function of controlling the input (storage, accumulation) and output (retrieve) of a document to and from such a box.

In the box, a document (image data) generated by scanning of the scanner 101, a document received by the facsimile device 105, a document input through the network, and the like are stored. Further, the document stored in the box is output in a form such as print output from the printer 103, transmission by the facsimile device 105, or transmission through the network.

Although the illustrated multifunction peripheral 100 is connected to plural different networks, the requirements regarding security may be different for each of the networks. For example, in an office, networks are divided depending on departments that handle highly confidential data and departments that do not, so that a case where the staff of the latter department cannot access highly confidential data through the network is the example. Even in such a case, it is difficult to install an expensive multifunction peripheral 100 for each department, and one multifunction peripheral 100 may be shared by plural departments. In such a case, the multifunction peripheral 100 is connected to a network of departments with strict security requirements (referred to as "first department" for convenience) and a network of other departments. In order to satisfy the security requirements of the former department, a box dedicated to the former department needs to be prepared as a box (storage area) in the multifunction peripheral 100 to prevent documents stored in the box from leaking out to the network of the latter department.

For example, the network of the first department and the network of another department different from the first department may use the same network address as the private IP address. In such a case, it is not possible to restrict the access to the boxes in the multifunction peripheral 100 or restrict the transfer of the document in the box by using an IP address. As a countermeasure, for example, at the time of transmitting a document in the box, in a case where a user, who instruct the transmission, designates a network interface 120 through which transmission is to be made, it is possible to prevent the document in the box from leaking out to the unexpected network. However, designating a network interface 120 through which transmission is to be made is a request with high difficulty for general users, there is a high possibility of leading to user confusion or incorrect selection.

Therefore, in the present exemplary embodiment, there is provided a mechanism for performing control such that documents stored in the box are prevented from leaking out to a network not permitted for security. This mechanism will be described below.

FIG. 3 shows the function group of the main control section 110 for this mechanism. The box memory section 111 stores information on one or more boxes and information on documents stored in each box. The input/output control section 113 controls input (storage) or output (such as transfer and printing) of a document to or from the box memory section 111.

The input/output destination determination section 115 determines the input source of the operation instruction or the input of the document to the box, and the output destination of the document in the box. The input source of the operation instruction to the box includes a local UI (that is, the display device 107) and a device on the network. Since the device on the network communicates with the main control section 110 through any one of the plural network interfaces 120, the input/output destination determination section 115 determines which one of the local UI and the plural network interfaces 120 the incoming operation instruction has been received from. Similarly, in a case where a document is input to the box, the input/output destination determination section 115 determines which one of the local scanner 101 and the facsimile device 105 (facsimile reception) or the plural network interfaces 120 the input source is. In a case of receiving an instruction to output a document in the box, the input/output destination determination section 115 determines which one of the local printer 103, the facsimile device 105 (facsimile transmission), and the plural network interfaces 120 the output destination is.

The box authentication section 117 performs authentication for access to the box of the user and authentication for inputting (storing) the incoming document to the box. The authentication is performed by using the password set in a box to be operated or to which a document is input, for example. In other words, in a case where the user intends to start an operation on the box, the user is prompted to input a password, and in a case where a correct password is input according to it, the operation from the user is permitted. In the case of facsimile reception addressed to the box, in a case where the password attached to the received document matches the password set in the box, the document is permitted to be accumulated in the box. In a case where the access control list is set for the box, a user authentication mechanism (not shown) performs user authentication for the user who intends to perform the operation of the multifunction peripheral 100, and the box authentication section 117 permits the user specified by user authentication to operate on the box within the range of authority permitted by the access control list for the box. For example, in a case where the authority to accumulate and print documents is granted, but the authority to transfer documents through facsimile or network is not granted for the user for the box, the transfer instruction from the user is not permitted. In addition, in a case where no password is set in the box and access control by the access control list is also not performed, the user is permitted to perform all operations on the box (however, an operation restriction to be described later corresponding to the input/output destination of the document to/from the box related to the operation is separately received).

The management information memory section 119 retains management information used for control of the input/output control section 113 with respect to input/output to/from the box. The retained management information includes box input/output information indicating permission/non-permission for input/output from each input/output destination for each box. For example, for each box, the box input/output information defines an input source that permits an operation instruction or a document input to the box, and an output destination that permits the output of the document in the box. In this case, input from the input source and output to the output destination for which permission is not defined in the box input/output information is not permitted. Further, instead of defining the input source and the output destination to be permitted, the box input/output information may define the input source and the output destination which are not permitted. In this case, input from the input source and output to the output destination for which non-permission is not defined in the box input/output information is permitted. Further, the box input/output information is not limited to defining separately the input source and the output destination, but may define collectively permission or non-permission for input and output to and from the box for a certain source (or the network interface 120).

In addition, from the viewpoint of preventing unintentional leakage of the document in the box, it is considered a case where the input (storage) to the box may not limited. In such a case, the box input/output information may be any one as long as it defines the output destination from the permitted box (or the output destination from the box not permitted). However, as in the example in which the multifunction peripheral 100 is connected to plural networks having different security requirements, in a case where a document from a network having a strict security requirement is accumulated in a box permitting output to a network with a loose security requirement, there is a risk of leakage to the latter network through the box. Therefore, in such a case, the input source is also defined in the box input/output information.

Further, the local input/output of the multifunction peripheral 100 (that is, not through the network), that is, the storage of the document from the scan, the facsimile or the like in the box, the printout, the facsimile transmission, and the like of the document in the box are the basic functions of the multifunction peripheral 100, and they may be permitted by default. In some specific examples shown below, it is assumed that local input/output to the box is permitted. In this case, it is assumed that the box input/output information defines permission or non-permission for input and output, with each network interface 120 as a path.

The input/output control section 113 refers to the management information such as the box input/output information and the like retained in the management information memory section 119 and controls the input and output of a document to each box in the box memory section 111.

Next, the process of the input/output control section 113 will be described using a specific example.

Figure 5:
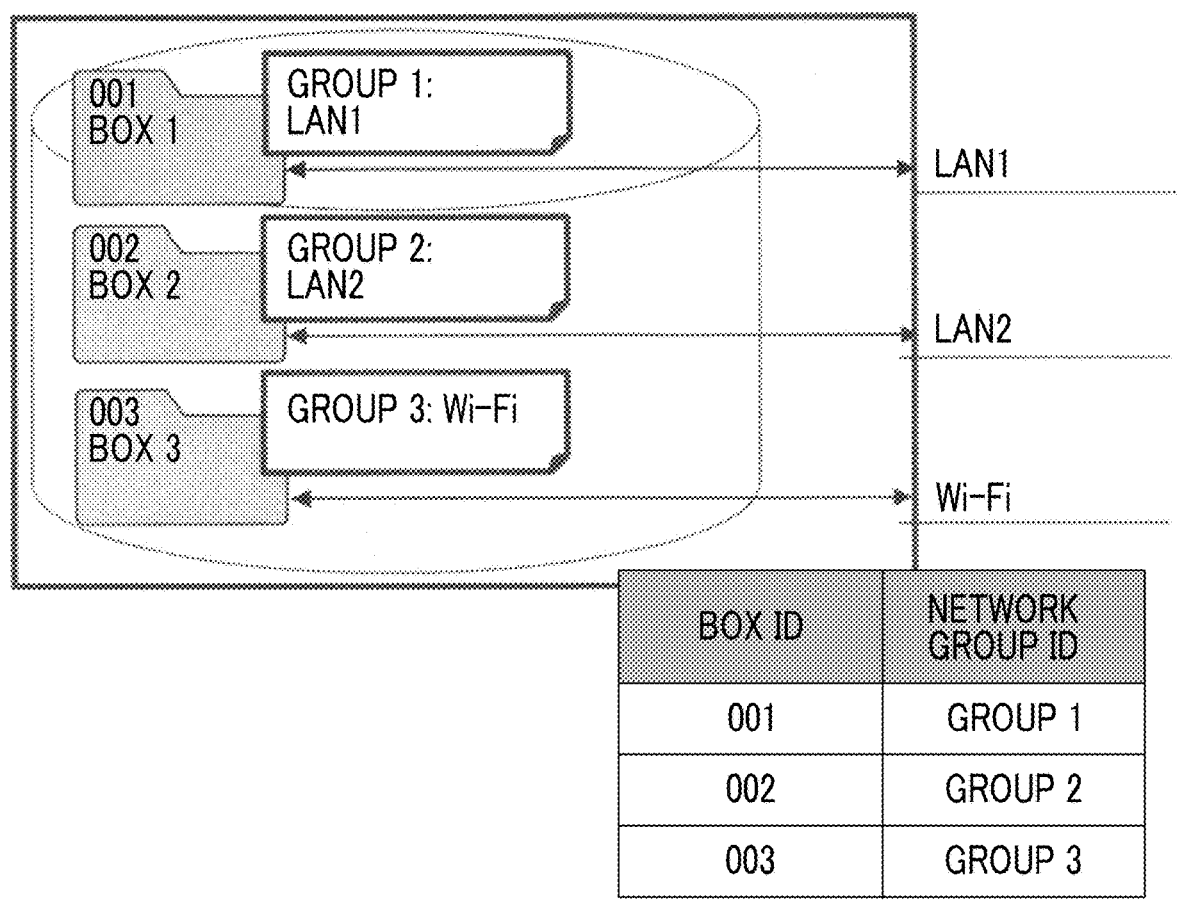
FIG. 5 is a diagram showing an example of box input/output information using the input/output path access authority information of FIG. 4.

FIG. 4 and FIG. 5 show the input/output path access authority information and the box input/output information retained in the management information memory section 119, used in one specific example. This example is the example of the case where the multifunction peripheral 100 is connected to three networks of LAN 1, LAN 2, and Wi-Fi shown in FIG. 1 (through the three network interfaces 120 corresponding thereto).

The input/output path access authority information shown in FIG. 4 is information defining a network group. This information includes the network group ID and the network interface information corresponding thereto. The network group ID is an ID for uniquely identifying the network group. The network interface information is a list of IDs of the network interfaces constituting the network group of the network group ID. In the example of FIG. 4, the "group 1" includes only the network interface 120 "(LAN 1")" (and a network leading to it) and the "group 5" includes two network interfaces 120 "LAN 1" and "Wi-Fi". The information on this group is used to indicate a group permitting input/output to the box in the box input/output information exemplified in FIG. 5. In the "group 4", the value of the network interface information is "None", which is used in a case of not permitting input and output to and from the box through the network interface 120 at all. "Group 5" is used in a case of dealing with documents that conform to similar security requirements in networks respectively connected by "LAN 1" and "Wi-Fi", for example. In a case where this group is associated with a box, documents handled (that is, stored or output) in the box are limited to those that communicate through LAN 1 and Wi-Fi.

The box input/output information shown in FIG. 5 defines the ID of the network group that is permitted to input/output to the box for each box in the box memory section 111. That is, in the examples of FIG. 4 and FIG. 5, the network interfaces 120 belonging to the network group associated with the box are permitted as both input and output paths to the box.

In the example of FIG. 5, a box named "Box 1" (box ID "001") is associated with group 1. Therefore, for the box 1, input and output through the network interface 120 with the ID "LAN 1" belonging to the group 1 is permitted, but input and output through the other network interfaces 120 is not permitted. That is, the mode of permitting the input and output of the document through the network path with respect to the box 1 is as follows.

1) Storing document through LAN 1 is permitted.
2) Storing document through LAN 2 or Wi-Fi is not permitted.
3) Output (retrieve and transfer) of document through LAN 1 is permitted.
4) Output of document through LAN 2 or Wi-Fi is not permitted.

In this example, since the local input/output is permitted by default, it is permitted to store the document by scanning and facsimile receiving, and output the document in the box 1 by printing and facsimile transmission.

As described above, the examples shown in FIG. 4 and FIG. 5 define a network that can use a box for each box. In this example, those that can be used for the box through the network (that is, those that can operate the box, store the document in the box, can retrieve the document in the box, or can be the transfer destination of the document) are limited to devices on the network belonging to the network group associated with the box. Therefore, each box in the multifunction peripheral 100 shared by plural networks can be separated for each network. Further, in this example, for documents stored in the box from the local (that is, from the scanner 101 or the facsimile device 105), in a case of retrieving the document from the remote computer or transferring the document to the remote computer, the box input/output information on the box is applied. Therefore, the documents stored in the box from such local are also prevented from leaking to the unintended network through the box.

Next, an example of a processing procedure executed by the input/output control section 113 will be described with reference to FIGS. 6 and 7.

Figure 6:
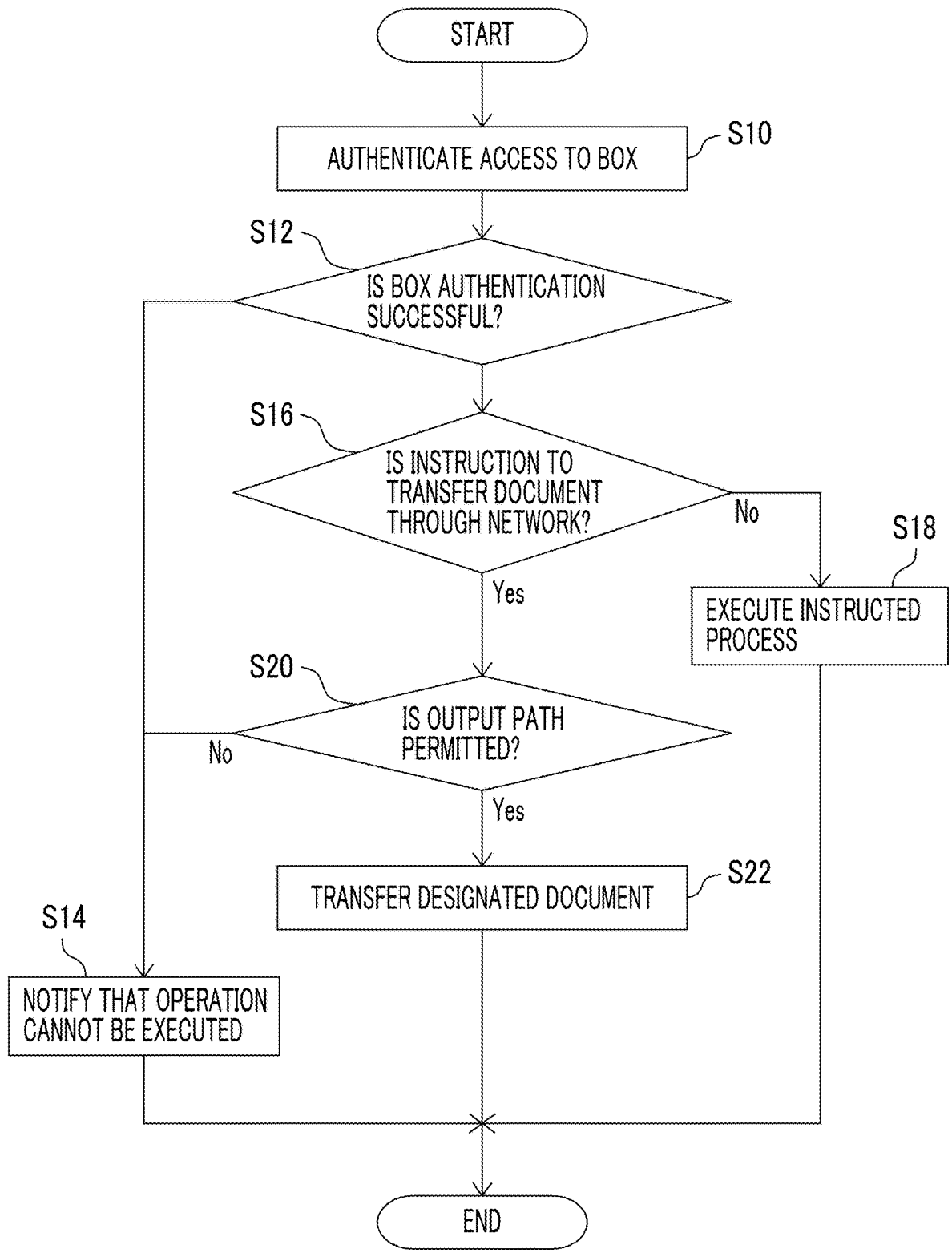
FIG. 6 is a flowchart illustrating a procedure of a process of an input/output control section for an instruction from a local user interface (UI) to a box.

FIG. 6 shows an example of a process executed by the input/output control section 113 in a case where the user designates a box on the screen of the local UI (display device 107) as an operation target. In this case, the input/output control section 113 causes the box authentication section 117 to perform the access authentication process for the box (S10). In a case where a password is set in the box, the box authentication section 117 displays a password input screen on the UI and requests the user to input a password. In response to this, in a case where the password input by the user matches the password set in the box, the box authentication section 117 makes the authentication success. In the case of a method of controlling access to the box by user authentication based access control list, the box authentication section 117 causes the user authentication mechanism (not shown) to perform login authentication of the user. In a case where this login authentication succeeds, the user ID of the user is obtained from the user authentication mechanism. Then, it is determined from the access control list of the box whether or not the user ID has any access right (authority of storing or retrieving documents to or from the box) for the box. In a case where the user has any access right for the box, the box authentication section 117 makes the authentication of S10 successful; and in a case where the user does not have any access right at all, it makes the authentication failure. The input/output control section 113 determines whether or not the authentication of the box authentication section 117 is successful (S12).

in a case where the authentication by the box authentication section 117 fails, the input/output control section 113 displays on the local UI, an error screen indicating that the operation on the designated box is not executable (S14) and ends the process.

In a case where the authentication of the box authentication section 117 is successful, the input/output control section 113 determines whether or not the instruction from the user concerning the box instructs an operation to transfer the document in the box through the network (S16). For example, in a case where a transfer operation using a network transfer protocol such as file transfer protocol (FTP) or simple mail transfer protocol (SMTP) is instructed, the determination result of S16 is Yes. In contrast, in a case where an operation other than the transfer through the network, such as printout of a document in the box, facsimile transmission, or storage of the document as a result of the scan in the box, is instructed, the determination result of S16 is No.

In a case where the determination result of S16 is No, the input/output control section 113 executes the process instructed by the user (S18). For example, in a case where the user instructs an operation to store the scanned document in the box, the input/output control section 113 receives the document generated by the scanner 101 and stores it in the box in the box memory section 111.

In a case where the determination result in S16 is Yes, the input/output control section 113 causes the input/output destination determination section 115 to determine which network interface 120 the output path to the transfer destination of the transfer (transmission) instructed by the user is. The input/output destination determination section 115 may perform the determination, for example, by determining that the address of the transfer destination (for example, IP address) is the address of a network leading to which network interface 120. Then, with reference to the management information memory section 119, the input/output control section 113 determines whether or not the network interface 120 determined by the input/output destination determination section 115 is permitted as the output path of the document in the box in the box input/output information (S20). In the case of the examples of FIGS. 4 and 5, in a case where the network interface 120 is included in the network group associated with the box, the determination result of S20 is Yes, and in a case where not included, the determination result of S20 is No.

In a case where the determination result of S20 is No, the input/output control section 113 displays on the local UI, an error screen indicating that the instructed operation is not executable (S14), and ends the process.

In a case where the determination result of S20 is Yes, the input/output control section 113 transfers the document designated as the transfer target to the designated transfer destination (S22).

Figure 7:
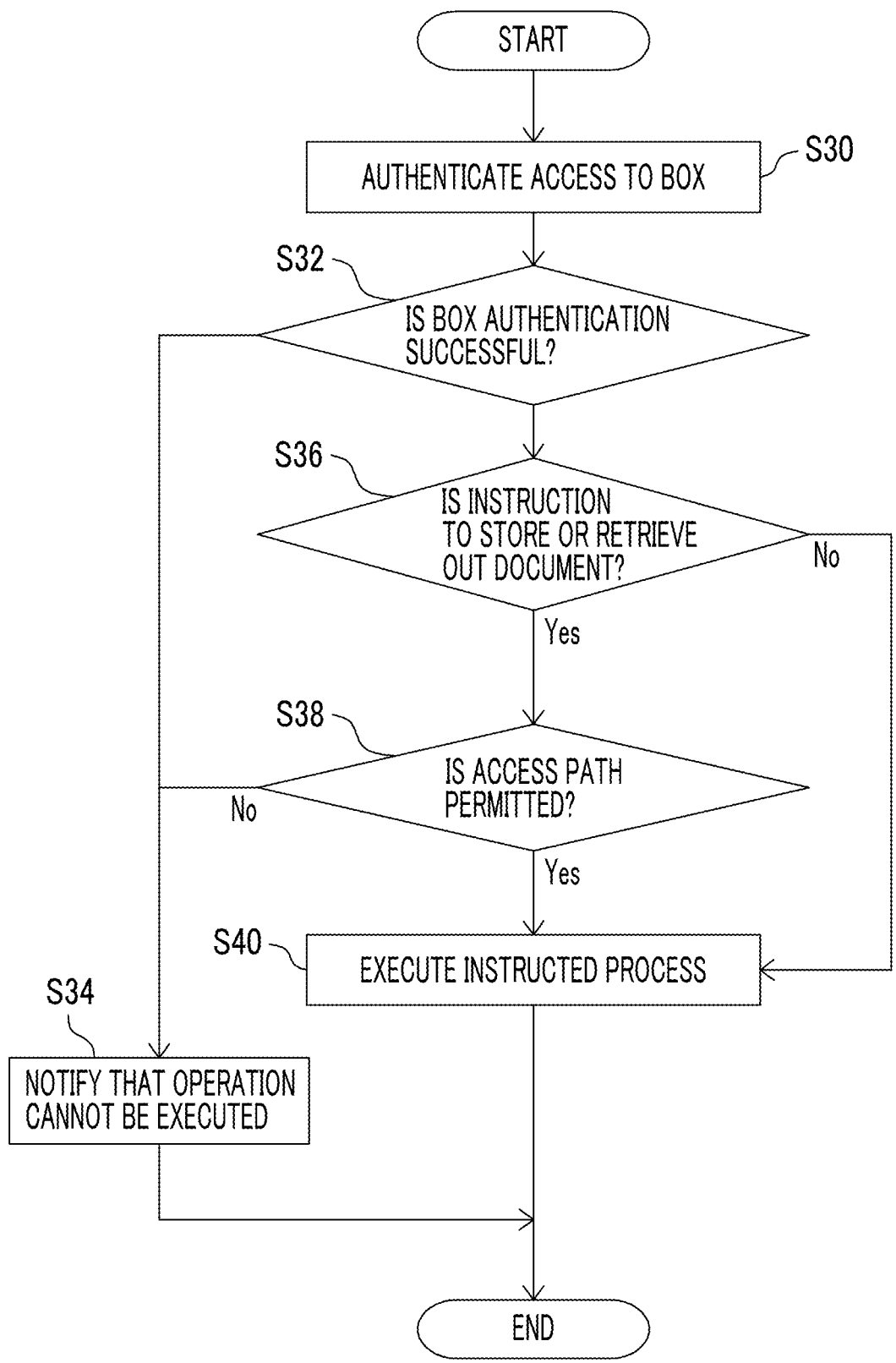
FIG. 7 is a flowchart illustrating a procedure of a process of the input/output control section for an instruction from a remote (network) to a box.

FIG. 7 shows an example of a process performed by the input/output control section 113 in a case where the user instructs an operation on a box from a remote computer connected to the multifunction peripheral 100 through a network. The operation for the box from the remote includes, for example, storing the document in the box (that is, uploading from the computer to the box), retrieving the document in the box (downloading from the box to the computer), displaying the operation screen of the box, and the like.

In this case, the input/output control section 113 causes the box authentication section 117 to perform the access authentication process for the box (S30). In a case where the instruction from the remote is a document storage instruction addressed to the box, the box authentication section 117 checks, for example, whether or not the password set in the box is included in the document storage instruction (S32). In a case where it is included, it is determined as authentication success; or otherwise, it is determined as authentication failure. In a case of receiving a request to access a box from a remote user, the box authentication section 117 prompts the user to input the password of the box, and in a case where the correct password is input in response to the request, the authentication is assumed to be successful. In a case of a method of controlling the access to the box by the access control list, as in the case of FIG. 6, in a case where the user authentication is successful, the box authentication section 117 obtains the user ID of which login is successful from the user authentication mechanism and determines from the access control list of the box whether or not the user ID has some access right for the box. In a case where the user has any access right for the box, the box authentication section 117 makes the authentication of S30 successful.

In a case where the authentication by the box authentication section 117 fails, the input/output control section 113 displays on the remote instruction source device, an error information indicating that the operation on the designated box is not executable (S34) and ends the process.

In a case where the authentication of the box authentication section 117 is successful, the input/output control section 113 determines whether or not the instruction from the remote user concerning the box is an instruction to store (upload) the document to the box or to retrieve (download) the document in the box (S36).

In a case where the determination result of S36 is No, the input/output control section 113 executes the process instructed by the user (S40). For example, in a case where the user's instruction requests display of the operation screen of the box, information on the operation screen is transmitted to the user's computer through the network.

In a case where the determination result in S36 is Yes, the input/output control section 113 causes the input/output destination determination section 115 to determine which network interface 120 the path that receives the instruction from the remote user is. Then, with reference to the management information memory section 119, the input/output control section 113 determines whether or not the network interface 120 determined by the input/output destination determination section 115 is permitted as the input or output path of the document in the box in the box input/output information (S38). In this determination, in the case of the document storage instruction, it is determined whether or not the determined network interface 120 is permitted as an input path, and in the case of a document retrieve instruction, it is determined whether or not the network interface 120 is permitted as an output path. In the case of the examples of FIGS. 4 and 5, since the input and output are not distinguished, in a case where the network interface 120 is included in the network group associated with the box, the determination result of S38 is Yes, and in a case where not included, the determination result of S40 is No.

In a case where the determination result of S38 is No, the input/output control section 113 returns error information indicating that the instructed operation is not executable to the computer of the remote user (S34) and ends the process. In a case where the determination result in S38 is Yes, the input/output control section 113 executes an operation instructed by the user, for example, storing the document to the box or retrieving the document in the box (S40).

In the procedure shown in FIG. 7, in a case of receiving an operation instruction from the remote computer to the box, it is determined from the combination of the instruction and the network of the computer whether or not the operation related to the instruction can be permitted, but the order of instruction and determination is only an example. Instead thereof, in a case where the user accesses the box in the multifunction peripheral 100 from the remote site, the input/output control section 113 determines whether input or output of the document to or from the box is permitted, from the computer and the operation not permitted may be displayed in an unselectable state (that is, a state in which the operation cannot be selected on the screen) on the operation screen, for example.

According to the process of FIG. 7, in a case where the user accesses the box from the remote computer, even in a case where the user has access right to the box, in a case where the computer is on the network which is not permitted to input or output documents to or from the box, it is impossible to store or retrieve documents to or from the box. However, even in this case, operations on the box other than storing or retrieving documents may be permitted to some extent. In addition, in a case where a computer accessing a box is on a network which is not permitted to input or output to or from the box, even a display of the operation screen of the box may not be permitted.

Next, another example of the box input/output information retained in the management information memory section 119 will be described with reference to FIG. 8 and FIG. 9.

Figures 8, 9:
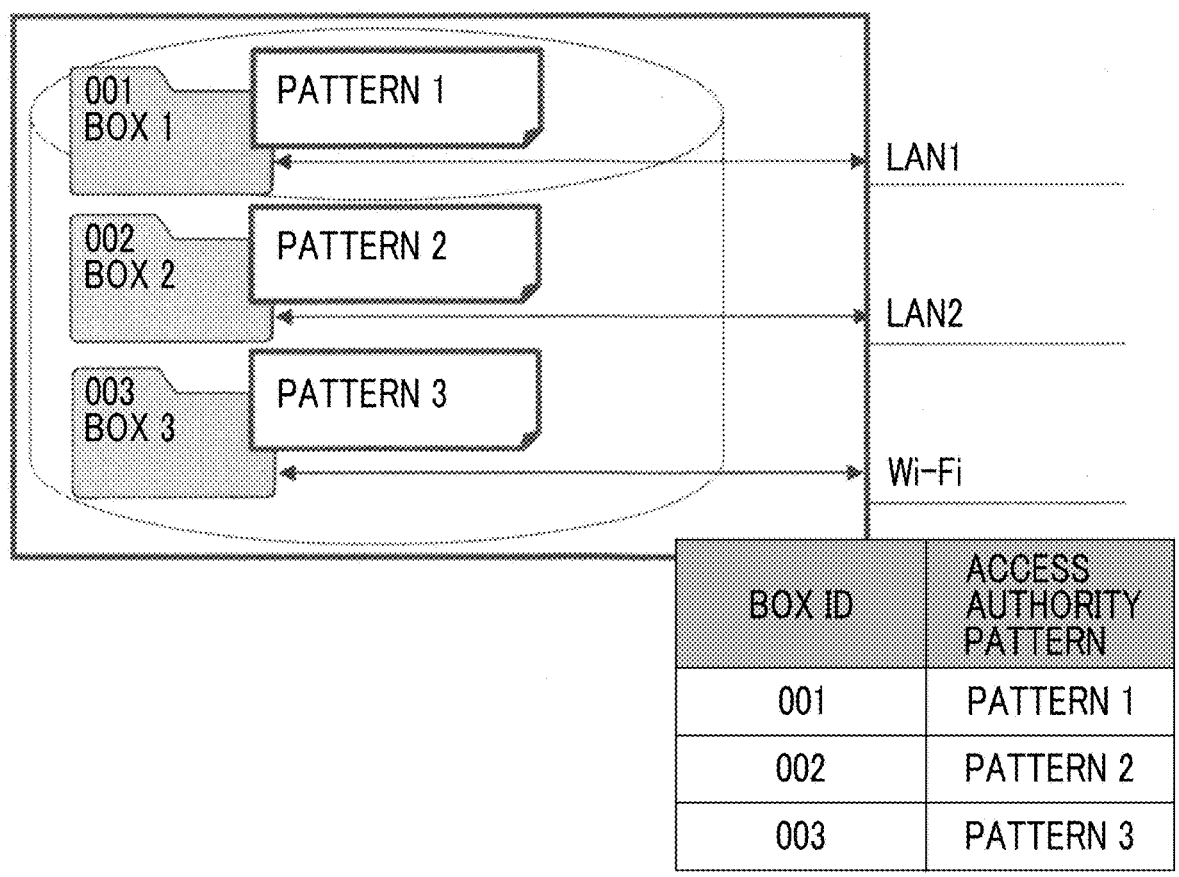
FIG. 8 is a diagram showing another example of the data structure of the input/output path access authority information.
FIG. 9 is a diagram showing an example of box input/output information using the input/output path access authority information of FIG. 8.

FIG. 8 shows an example of input/output path access authority information in this example. Unlike the example of FIG. 4, the input/output path access authority information is defined separately for an input path and an output path. That is, the input/output access authority information of FIG. 8 defines one or more patterns, with a combination of an input-permitted path and an output-permitted path as a single pattern. The input-permitted path is one or more network interfaces 120 permitted as an input path of a document to the box, and the output-permitted path is one or more network interfaces 120 permitted as an output path of a document in the box. For example, in the pattern 3, three network interfaces 120 of LAN 1, LAN 2, and Wi-Fi are permitted as the input path to the box, but no network interface 120 is permitted as the output path ("None"). This means that the output of the document in the box is not permitted through the network at all.

The box input/output information shown in FIG. 9 defines the pattern ID of the input/output access authority information set in the box, for each box in the box memory section 111.

In the example of FIG. 9, box 1 (box ID "001") is associated with pattern 1. Therefore, for the box 1, input (storage) of a document through two network interfaces 120 of LAN 1 and Wi-Fi and output of a document through LAN 1 are permitted. Therefore, in the case of the multifunction peripheral 100 connected to the LAN 1, the LAN 2 and the Wi-Fi illustrated in FIG. 1, the mode of permitting the input and output of the document through the network with respect to the box 1 is as follows.

1) Storing document through LAN 1 or Wi-Fi is permitted.

2) Storing document through LAN 2 is not permitted.

3) Output (retrieve and transfer) of document through LAN 1 is permitted.

4) Output of document through LAN 2 or Wi-Fi is not permitted.

The pattern 1 associated with the box 1 is handling documents requiring similar confidentiality, for example, in a network to which LAN 1 and Wi-Fi are connected, but is useful in a case where LAN 1 has higher security as a network than Wi-Fi. That is, since input of a document to the box 1 is performed once for the document, even in a case where the input from both the LAN 1 and the Wi-Fi is permitted, the risk of leakage is small, but the document is output many times for one document, so the risk of leakage is reduced by permitting only LAN 1, which is considered to have less risk of leakage than Wi-Fi.

In the case of the box 3 in which the pattern 3 is set, the mode of permitting the input and output of the document through the network is as follows.

1) Storing document through LAN 1, LAN 2, or Wi-Fi is permitted.
2) Output (retrieve and transfer) of document through LAN 1, LAN 2, or Wi-Fi is not permitted.

In the pattern exemplified in FIG. 8, only one network interface 120 is designated as the output-permitted path, but plural network interfaces 120 may be set as the output-permitted path.

The procedure of control of the input/output control section 113 based on the input/output path access authority information and the box input/output information illustrated in FIG. 8 and FIG. 9 may be the same as the procedure shown in FIG. 6 and FIG. 7.

Next, an example of output control of a document in a box using undesignated information will be described.

There are cases where plural network interfaces 120 permitted as document output paths are set for the box. For example, in a case where there is a box in which group 5 of FIG. 4 is set, the box corresponds to this case. In the case of transferring a document in the box through a network, there is a case where a document can be transferred to the transfer destination even in a case where any one of the plural network interfaces 120 set as an output path is used. In this case, in a case where the user instructing the transfer does not explicitly designate the network interface 120 which is the path of the document transfer, the document is transferred through the one selected by the operating system among the plural network interfaces 120. However, for example, as the relationship between the LAN 1 and the Wi-Fi exemplified above, the plural network interfaces 120 set in the box as the paths for which document output is permitted are connected to the same network, but there may be superior or inferior in terms of a risk of leakage of transfer data. In this case, the network interface 120 selected by the operating system from the plural network interfaces 120 is not always better in terms of the risk of leakage.

As described above, the case where the user does not designate the network interface 120 as the path of document transfer is described as an example. However, for example, in a case where a processing flow including document transfer (an instruction described in JP2013-138284A is an example thereof) is applied to a box, in the processing flow, the name, address, or the like of the transfer destination apparatus is described, but a network interface through which transmission is to be made is often not defined in many cases. Therefore, the same situation may occur in a case where the processing flow is used for a box.

In order to prevent such a situation, in this example, undesignated information can be set for the box. The undesignated information defines the network interface 120 used as the output path in a case where the network interface 120 of the output path in a case of transferring the document in the box through the network is not explicitly designated by the user, the processing flow, or the like.

FIG. 10 shows an example in which an undesignated information item is added to the input/output path access authority information of FIG. 4. The network interface 120 indicated in the undesignated information item is selected from one or more network interfaces 120 indicated in the item of network interface information. In the illustrated example, the box for which the group 6 is set is permitted to store, retrieve, and transfer documents through the LAN 1 and Wi-Fi, but in a case where a network interface 120 through which transfer is to be made in the transfer instruction of document in the box is not designated by the user, or the like, the input/output control section 113 selects the LAN 1 defined in the undesignated information as a path in a case of transfer relating to the instruction.

By such control, in a case where the network interface 120 as the path in the transfer of the document in the box is not explicitly designated, it is prevented the network interface 120 which is inferior in terms of leakage or the like from being selected as the path by the operating system.

In the above exemplary embodiment and its modification examples, the network interface 120 through which transfer is to be made in transferring documents in the box is explicitly designated by the user, but in a case where the network interface is not permitted as an output path in the box input/output information for the box, the input/output control section 113 does not perform the transfer and responds to the user that execution is not executable.

FIG. 10 shows an example in which an undesignated information item is added to the input/output path access authority information of FIG. 4, but the undesignated information item can also be added to the input/output path access authority information of FIG. 8 and operated, similarly.

The main control section 110 of the multifunction peripheral 100 exemplified above may be realized, for example, causing a computer built in the multifunction peripheral 100 to execute a program representing the function of each functional module in each apparatus. Here, the computer has as hardware, a circuit configuration in which for example, a processor such as a CPU, a memory (primary storage) such as a random access memory (RAM) and a read only memory (ROM), an HDD controller controlling a hard disk drive (HDD), various input/output (I/O) interfaces, a network interface performing control for connection with a network such as a local area network, and the like are connected through, for example, a bus. In addition, a disk drive for reading from and/or writing to a portable disk recording medium such as a CD or a DVD, a memory reader/writer for reading from and/or writing to portable nonvolatile recording media of various standards such as a flash memory, or the like may be connected to the bus, through for example, I/O interface. A program in which the processing contents of the respective function modules exemplified above are described is stored in a fixed memory device such as a hard disk drive through a recording medium such as a CD or a DVD or through a communication means such as a network, and is installed in a computer. A program stored in a fixed memory device is read into a RAM and executed by a processor such as a CPU to realize the function module group exemplified above.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a plurality of network interfaces;
a memory device having a plurality of storage areas for storing data, and storing output regulation information that defines an output permission of each of the storage areas with respective to the network interfaces; and
a processor, configured to output the data stored in the storage areas to the network interfaces based on the output permission of each storage area,
wherein the output regulation information includes network group IDs and network interface information, each network group ID is an ID for uniquely identifying each network interface, the network interface information is a list of IDs individually corresponding to the plurality of network interfaces, and each network interface is in association with the data stored in each storage area.

2. The information processing apparatus according to claim 1,
wherein the processor is configured to further perform a control that the data in the storage areas is not output through a network interface other than an output-permitted network interface permitted as the output path by the output regulation information associated with the each storage area, among the plurality of network interfaces.

3. The information processing apparatus according to claim 2,
wherein the processor is configured to store an input regulation information that defines an input-permitted network interface permitted as an input path of data to be stored in the storage areas in association with the each storage area.

4. The information processing apparatus according to claim 3,
wherein the processor is configured to perform a control that data in the storage areas is not stored through a network interface other than the input-permitted network interface permitted as the input path by the input regulation information associated with the each storage area, among the plurality of network interfaces.

5. The information processing apparatus according to claim 2,
wherein the output regulation information also defines an output-permitted network interface as an input-permitted network interface permitted as an input path of data to be stored in the storage area,
the processor is configured to perform a control that data in the storage areas is not stored through a network interface other than the input-permitted network interface defined by the output regulation information, among the plurality of network interfaces.

6. The information processing apparatus according to claim 2,
wherein the processor is configured to further receive a setting of the output regulation information, and receive a setting of an output-permitted network interface permitted as an output path of data stored in the storage areas or a network interface not permitted, on a per-group basis including one or more network interfaces among the plurality of network interfaces.

7. The information processing apparatus according to claim 1,
wherein the processor is configured to store an input regulation information that defines an input-permitted network interface permitted as an input path of data to be stored in the storage areas in association with the each storage area.

8. The information processing apparatus according to claim 7,
wherein the processor is configured to perform a control that data in the storage areas is not stored through a network interface other than the input-permitted network interface permitted as the input path by the input regulation information associated with the each storage area, among the plurality of network interfaces.

9. The information processing apparatus according to claim 1,
wherein the output regulation information also defines an output-permitted network interface as an input-permitted network interface permitted as an input path of data to be stored in the storage area,
the processor is configured to perform a control that data in the storage areas is not stored through a network interface other than the input-permitted network interface defined by the output regulation information, among the plurality of network interfaces.

10. The information processing apparatus according to claim 1,
wherein the processor is configured to further receive a setting of the output regulation information, and receive a setting of an output-permitted network interface permitted as an output path of data stored in the storage areas or a network interface not permitted, on a per-group basis including one or more network interfaces among the plurality of network interfaces.

11. The information processing apparatus according to claim 1,
wherein the processor is configured to further retain an undesignated output network interface information in association with the each storage area; and
the processor is configured to further output the data through a network interface indicated by the undesignated output network interface information, in a case where there is no designation of a network interface as an output path of the data in an instruction to output data in the storage areas through a network.

12. A non-transitory computer readable medium storing a program causing a computer having a plurality of network interfaces to function as:
a memory device having a plurality of storage areas for storing data, and storing output regulation information that defines an output permission of each of the storage areas with respective to the network interfaces; and
wherein the computer is configured to output the data stored in the storage areas to the network interfaces based on the output permission of each storage area,
wherein the output regulation information includes network group IDs and network interface information, each network group ID is an ID for uniquely identifying each network interface, the network interface information is a list of IDs individually corresponding to the plurality of network interfaces, and each network interface is in association with the data stored in each storage area.

* * * * *